(12) United States Patent
Morley

(10) Patent No.: US 10,215,219 B1
(45) Date of Patent: Feb. 26, 2019

(54) MULTI-FUNCTION TOOL AND HANDLE HOOK

(71) Applicant: Jeremiah Morley, Oregon City, OR (US)

(72) Inventor: Jeremiah Morley, Oregon City, OR (US)

( * ) Notice: Subject to any disclaimer, the term of this patent is extended or adjusted under 35 U.S.C. 154(b) by 0 days.

(21) Appl. No.: 15/889,946

(22) Filed: Feb. 6, 2018

(51) Int. Cl.
| | |
|---|---|
| *E06C 7/14* | (2006.01) |
| *F16B 45/06* | (2006.01) |
| *F16M 13/02* | (2006.01) |
| B25F 5/02 | (2006.01) |
| B25H 3/04 | (2006.01) |

(52) U.S. Cl.
CPC ........... *F16B 45/06* (2013.01); *F16M 13/022* (2013.01); *B25F 5/02* (2013.01); *B25H 3/04* (2013.01)

(58) Field of Classification Search
CPC .......... B25B 21/00; B25H 3/006; B23D 45/16
See application file for complete search history.

(56) References Cited

U.S. PATENT DOCUMENTS

| | | | |
|---|---|---|---|
| 4,628,893 A | 12/1986 | Shaw, III | |
| 4,895,336 A * | 1/1990 | Lieberman | B25H 3/006 248/328 |
| 5,331,721 A | 7/1994 | Raum, Sr. | |
| 6,230,367 B1 * | 5/2001 | Riedl | B25B 21/00 16/422 |
| 6,641,011 B1 | 11/2003 | Kahn | |
| 8,070,027 B2 | 12/2011 | Piatt, Sr. et al. | |
| 9,457,461 B2 * | 10/2016 | Francis | B23D 45/16 |
| 2004/0050888 A1 | 3/2004 | Warner | |

OTHER PUBLICATIONS

Cox, parts list for CNA 15" Avon showing ladder hook kit as part No. 7XL001, Apr. 15, 2008, photograph of dated parts list, 1 page.
Cox, Cox Ladder Hook Kit 7X1021, posted at coxdispensers,com, © 2017 Sulzer Ltd., [online], [site visted Jan. 25, 2018], 1 page, available from Internet, <URL: https://www.coxdispensers.com/product-search-results?combine=hook&=Go%21>.

* cited by examiner

*Primary Examiner* — Amy J. Sterling
(74) *Attorney, Agent, or Firm* — Howard Russell

(57) ABSTRACT

Multi-function tool and handle hook adapted for attachment to and convenient hanging of a plurality of tools or releasable receipt and engagement of a bail or wire handle on a bucket or other tool comprising a hook member, a releasable tightening member, and a multi-function attachment member adapted for engaging and firmly holding any of the plurality of tools together with the tightening member. The attachment member and the tightening member comprise a channel with a plurality of parallel channel walls, each wall also comprising an opposing hooked end, adapted alternatively for receiving and releasably holding in the attachment member and tightening member any one of a plurality of differently-configured caulking guns, for example, and releasable receipt and pivotable transverse engagement with a wire handle, for example for a bucket.

18 Claims, 10 Drawing Sheets

MULTI-FUNCTION TOOL AND HANDLE HOOK

FIELD OF THE INVENTION

The present invention relates to a tool hook for attachment to an eyeletted frame of a tool, such as a calking gun, and adapted for enabling hanging of the tool on a rung of a ladder, a scaffolding, a wall hook, a tool belt, or other supporting location, and more particularly to a multi-use tool hook adapted for use with a wide variety of eyeletted frame tools, such as a number of commonly available different brands of caulking guns, as well as any other tool-type item having a eyeletted frame bracket thereon, such as a skill saw, a reciprocating saw, a drill, an impact drill, etc., or any other tool-type item having a handle or other elongated wire or bail attached thereto, such as a bucket handle on a five-gallon bucket, a smaller bucket, a wire frame drying frame or handle, or other tool, such as a power saw or a drill, having adapted thereon such a handle or bail.

BACKGROUND OF INVENTION

Workers use a myriad of different portable tools, such as hand drills, skill saws, reciprocating saws, caulking guns, buckets with handles, and other tools, to get their construction, cleaning, and other jobs done. Often times it is useful for a worker to have his or her hands free, so the worker must therefore either set a tool down or hang it at a convenient location somewhere to be able to be "hands-free." Or, alternatively, it is also desirable to be able to hang such tools, such as on a pegboard or wall hook, for storage purposes when the tools are not in use.

Thus there have been provided prior tool hooks adapted for allowing hanging of a tool or other item on a supporting member, such as a wall hook, a rung of a ladder, a hole in a ladder, a scaffolding rail, a swing stage system, a tool belt or some other supporting location. For instance, U.S. Pat. No. 8,070,027, issued 12 Jun. 2011, for Adaptable Tool Hook, to Piatt, et al., teaches an adaptable tool hook comprising a wire-frame buckle and hook with a strap, wherein the hook stays with the tool and can be hooked on any available belt, pocket, rail, or wire.

U.S. Pat. No. 9,457,461, issued 4 Oct. 2016, for Dual Axis Hook Assembly for a Power Tool, to Francis et al., teaches a hook support attached to the housing of a power tool, the hook support being rotatable in a first axis and having a shank portion also configured to rotate in a second axis adapted for allowing hanging of the tool from a supporting location.

U.S. Pat. No. 4,628,893, issued 16 Dec. 1986, for Bow Hanger, to Shaw, III, teaches a bow hanger having steel plate members and a hook within the members for hanging the bow on a stationary object. The steel plate members are separated to receive an upper bow limb and are screwed together to clamp on the upper bow limb.

U.S. Pat. No. 5,331,721, issued 26 Jul. 1994, for Universal Belt Clip, to Raum, Sr., teaches a universal thermoplastic "U"-clip with adhesive affixed to one of its legs for supporting diverse semi-flat non-porous articles.

U.S. Pat. No. 6,641,011, issued 4 Nov. 2003, for Hand-Held Tool Holder, to Kahn, teaches a strap member with an eye in one end and adapted for wrapping the strap around the handle of a tool, such as a nail gun, feeding the strap through the eye to enable hanging of the tool on a hook, such as on a user's belt.

US Published Patent App. No. 2004/0050888, published 18 Mar. 2004, for Universal Tool Support Apparatus and Methods, to Warner, teaches a universal tool attachment for quick and easy attachment and detachment for almost any work tool.

Prior art tool hooks, made of plastic, and some made of metal, adapted for attachment to a single brand of eyeletted-frame caulking gun, and not adapted for optional attachment to the bail of a bucket or other wire attachment system on another type of tool, have been sold, both by applicant and others. But such, having been made in some cases of plastic, have easily broken, and because they have not been adaptable for multiple different types of tools and wire handles they have required multiple hooks for multiple applications.

Prior art tool hooks have suffered to varying degrees from different concerns: some have not been configured so as to resist bumping dislodging and subsequent dropping of the tool—whether it be so as to dislodge the tool from the hook, or otherwise to dislodge the hook from the supporting structure. Others have been limited so as to be adaptable only for use on a certain design of tool. Of course, this has presented problems, for example in the caulking gun tool market, since while most caulking guns are provided with a frame member on which a tool hook may be attached, different manufacturers have provided different frame member styles—thus frustratingly necessitating a different tool hook for each type of caulking gun frame member design. Still further prior art tool hooks have not been readily adapted for both attachment to a tool frame member as well as a bail type handle common to a standard five-gallon or one-gallon bucket. Still others, as mentioned previously, have been easily broken.

Existing caulking guns made by a number of different manufacturers under different brand names each have had differently-angled, differently designed, and differently-sized rear attachment bracket frame portions. This fact has made it difficult for a single took hook, i.e., a multi-function tool hook, to successfully adapt to a number of differently-configured such caulking gun attachment bracket frames.

In order to hang a bucket, prior art hooks have been developed such as a swivel tool paint pail hook, and hooks have been fashioned out of wire. Some such hooks have employed a carabiner with a swivel chain and a sharp, pointed hook on the end. Of course, a sharp hook such as this has been hazardous, and such a tool has not been readily adaptable for use with multiple tool types.

It would have been desirable for there to have been provided a multi-function tool and bucket handle hook capable of secure but readily releasable attachment to any of a number of different tool frame types (such as a plurality of available caulking gun frame types despite design differences from one frame to the next) as well as alternatively capable of secure but readily releasable attachment to a bail wire handle for a bucket or other tool.

SUMMARY OF THE INVENTION

In accordance with a first aspect and an embodiment of the invention, there is provided a multi-function tool and handle hook adapted for attachment to and convenient hanging of a plurality of tools and alternatively releasable receipt and engagement for convenient hanging of a bail or wire handle on a bucket, a wire frame drying fan frame or handle, or other tool. The tool and handle hook of this aspect and embodiment of the invention comprises a hook member, which hook may be elongated, and having a proximal end, a middle portion, and a distal end, the hook member being adapted for hooking engagement adjacent the distal end on a support structure. There is further provided at least one tightening member (preferably a screw-on, or alternatively a clamp-type, tightening member) adapted for engaging and firmly holding any of the plurality of tools. Further there is provided a multi-function attachment member fixed to, attached to, on, or integral with, the proximal end of the hook member. The multi-function attachment member is preferably adapted for receiving and retaining for engagement with the at least one tightening member (or alternatively it will be appreciated that the hook member could receive and retain one or more tightening members, screw-on threaded, or otherwise), and the attachment member and the at least one tightening member are adapted for releasable attachment to any of a plurality of differently-configured tools.

The attachment member and the tightening member in combination comprise a preferably longitudinally extending, preferably block "U"-shaped, channel further comprising a plurality of parallel channel walls adapted for receiving and retaining one of a plurality of differently-configured tools by, or in, the attachment member. A first parallel wall of the channel is preferably integral with the attachment member. A second parallel wall of the channel preferably comprises the tightening member. An optional alignment, or pinning, member is formed by either the attachment member, the tightening member, or a combination of these. The aforementioned plurality of parallel channel walls of the attachment member and tightening member combination further comprise opposing hooks adapted for, alternatively to being adapted for releasably fixed, rigid, temporarily non-moveable, attachment to a tool such as to the frame of a caulking gun, releasable receipt (transversely of said parallel walls) and secure, but swinging, or in other words pivoting or pivotable, engagement and hanging of the bail or wire handle of another tool—for example for enabling hanging of the wire handle of a bucket.

In accordance with another aspect of the invention, the multi-function attachment member further comprises a plurality of multi-angled and sized engagement ridges or edges adapted for multi-size and multi-angled fitment and adjustment on any of a plurality of tools for engaging differently-angled brackets of different tools.

This aspect of the invention makes the multi-function tool and handle hook readily adaptable for secure attachment to any of a number of differently-shaped attachment brackets on a tool such as any of a number of different brands of caulking guns having differently-angled attachment bracket rear-angle, or other, portions.

In accordance with another aspect of the invention, the multi-function attachment member and tightening member combination further comprises at least one alignment member, or pinning, member for successfully adapting the multi-function attachment member and tightening member combination of the multi-function tool and handle hook to a void, or one or more differently-sized and positioned voids or holes, defined by the any of a plurality of differently-designed tool bracket frame members (such as for example those of different brands from different manufacturers of caulking guns). This aspect of the invention makes the multi-function tool and handle hook adaptable to a larger number of differently-designed and manufactured tools, since the alignment member passes through the void or voids in a tool or tool frame bracket and stops the multi-function tool and handle hook from sliding too far off of a particular tool bracket frame member.

Preferably, in accordance with an embodiment of the invention, the at least one tightening member comprises an engagement member and at least one threaded screw member, but preferably a plurality of threaded screw members, releasably interconnecting the engagement member of the at least one tightening member and the multi-function attachment member, at least one of the plurality of threaded screw members adapted to pass through or correspond to one or more voids or a plurality of holes in a frame member upon installation of the multi-function tool and handle hook on any of the any of a plurality of tools. This aspect and embodiment of the invention further enables the multi-function tool and handle hook to be more readily adaptable to the any of a plurality of tools.

In accordance with another aspect of the invention, the aforementioned at least one alignment, or stop, member further comprises two opposing halves of a rectangular alignment member adapted to pass through at least one of differently-sized and positioned void, voids or holes defined by the any of a plurality of tools, or any of their frames, upon installation of the multi-function tool and handle hook on the any of a plurality of tools, and depending upon positioning of the alignment member so as to correspond with and pass through the at least one of differently-sized and positioned void, voids or holes.

This aspect of the invention makes the multi-function tool and handle hook more adaptable to be securely fastened to the any of a plurality of differently-designed tools. Further, this embodiment enables a clam-shell like configuration of the multi-function attachment member and the tightening member adaptable for secure, rigid and fixed attachment to the any of a plurality of tools, while at the same time further being adapted for enabling the multi-function tool and handle hook to function as a solid unit with the two halves of the rectangular alignment member tightened together (when the hook is not otherwise attached to a tool) to be adapted to enable secure gripping and retaining of a wire handle of a bucket, for example.

In accordance with another aspect of the invention, the multi-function tool and handle hook is provided wherein at least one of the opposing hooks of said multi-function attachment member further comprises a secured-engagement hook extension, in that it may have an additional pointed hooking tip thereon, for better hooking and holding the bail or wire handle. This aspect of the invention helps ensure that the hook will remain engaged on the bail or wire handle for improved safety and stability of engagement of a bucket, or other tool, for example on an elevated platform where dropping a tool, or bucket, could be hazardous, or at least very inconvenient.

In accordance with another aspect and embodiment of the invention, a multi-function tool and handle hook is provided wherein the distal end of the hook member further comprises a counter-hook for engaging an inner edge of an internal void or hole defined in the support structure to prevent dislodging of the multi-function tool and handle hook from the support structure. This aspect of the invention, of course, enhances the safety of the multi-function tool and handle hook so as to help prevent dislodgement of the same from a hole in the support structure, such as for example a hole defined in the top step of an a-frame-type, free-standing, step ladder.

In accordance with another aspect of the invention, and alternatively to a first function thereof, the multi-function tool and handle hook may be readily installed in the field on a bail or wire handle, such as for example for a bucket or wire-frame drying fan handle, by initially substantially aligning the bail or wire handle longitudinally in line parallel with the channel walls of the multi-function attachment member and tightening member combination. Thereafter, completion of installation on the bail or wire handle is further secured and accomplished by rotating the bail or wire handle towards a transverse, or perpendicular, orientation of the bail or wire handle relative to the parallel channel walls, so as to be retained within the opposing hooks for holding of the bail or wire handle.

Thus, there is provided a multi-function tool and handle hook adapted for more rigid attachment to and convenient hanging of a plurality of tools and/or releasable receipt and pivotable, swinging, engagement of a bail or wire handle on a bucket or other tool comprising a hook member, a releasable tightening member and a multi-function attachment member adapted for engaging and firmly holding any of the plurality of tools together with the tightening member.

Thus, in accordance with an aspect and embodiment of the invention, at least one wall of the longitudinally extending channel further comprises an opposing hooked end, adapted alternatively for receiving and releasably fixed, ridged, temporarily non-moveable, retaining and attachment to one of a plurality of differently-configured tools, such as to the frame of one of several brands of caulking guns, and alternatively releasable and transverse receipt and secure, but swinging, pivoting, or pivotable engagement holding of the bail or wire handle of another tool, such as the wire handle of a bucket or fan.

In accordance with one or more aspects of the invention set forth above, there is provided an embodiment of a multi-function tool and handle hook adapted for attachment to and convenient hanging of any of a plurality of tools, and alternatively releasable receipt and engagement for convenient hanging of a bail or wire handle on a bucket, fan or other tool. The multi-function tool and handle hook of this embodiment of the invention comprises a hook member having a proximal end and a distal end and is adapted for hooking engagement adjacent the distal end on a support structure, the distal end of the hook member further preferably comprising a counter-hook for engaging an inner edge of an internal void or hole defined in the support structure to prevent dislodging of the multi-function tool and handle hook from the support structure.

The multi-function tool and handle hook of this embodiment of the invention further comprises at least one tightening member adapted for engaging and firmly holding any one of the plurality of tools and a multi-function attachment member fixed adjacent the proximal end of the hook member, the attachment member adapted for engaging with the at least one tightening member, the attachment member and the at least one tightening member adapted for releasable attachment to any of a plurality of differently-configured tools. Further, in accordance with this embodiment of the invention, the at least one tightening member comprises at least one threaded screw member releasably interconnecting the at least one tightening member and the multi-function attachment member, the at least one threaded screw member being adapted to extend or partially pass through a hole, or at least one of a plurality of holes, in a frame member of the any of a plurality of tools.

Still further, in accordance with this embodiment of the invention, the attachment member and the at least one tightening member, when combined and screwed together, also form a longitudinally extending channel comprising a plurality of parallel channel walls adapted for receiving and retaining one of a plurality of differently-configured tools in the channel formed by the attachment member and the at least one tightening member. A first wall of the channel is preferably integral with the attachment member, and a second wall of the channel is formed by the tightening member. The multi-function attachment member of this embodiment of the invention further comprises a plurality of multi-size adjustment ridges, ledges, or fitment guides on an inner surface of the tool hook adjacent the multi-function attachment member and adapted for engaging and securely holding differently-angled brackets of a tool.

Thus, in order to install the multi-function tool and handle hook of the invention on the frame of a tool, such as on the frame of a caulking gun, a drill, or a saw, the multi-function attachment member at the proximal end of the hook member is laid against the frame of the tool such that the hook rests on a ledge of the tool frame and such that a portion (e.g., ½) of an alignment member, comprising a rectangular member fixed to the attachment member, aligns with a hole in the tool frame. The tightening member is placed on the other side of the frame of the tool opposite the multi-function attachment member, the attachment member and the tightening member thus forming a channel in which the tool frame rests. The first half of the alignment and pinning member is fixed to the multi-function attachment member, and there is provided another half of a rectangular cubical alignment and pinning member fixed on the tightening member opposite the first half of the rectangular cubical alignment and pinning member. There is preferably provided also a threaded screw-type member adapted for passing through the two rectangular halves of the rectangular alignment and pinning member, or alignment guide, when the attachment member and the tightening member are screwed together to form a solid unit (whether on the frame of a tool or not). When the tool hook is installed on the frame of a tool, the two corresponding halves of the alignment and pinning member are adapted to reside at least partially within a hole of the tool frame. The two halves of the alignment and pinning member are aligned such that the threaded screw of the tightening member is adapted to pass through the tightening member, through the first and second halves of the rectangular cubical alignment member, and thus through the hole of the frame of the tool, with the frame of the tool aligned longitudinally with the channel, and then also the threaded screw member screwing into the attachment member opposite the tightening member (whether or not the hook is installed on a tool and/or its frame). Before completely tightening the threaded tightening member clamping on the frame of the tool, the hook is adjusted relative to the frame of the tool so that a rear angled portion of the frame of the tool rests against one of the plurality of angled fitment guides or ledges on the inner surface of the tool hook adjacent the multi-function attachment member.

Once the frame of the tool is inserted into the channel until a top portion of the frame rests on the floor of the channel, and/or until upper portions of the channel walls abut a ledge, or shelf, on the tool frame, and/or until an angled portion of the frame rests against angled fitment guides or ledges on the inner surface of the tool hook adjacent the multi-function attachment member, the tool frame is positioned in the channel such that the threaded screw of the screw-type tightening member is enabled to pass through a hole in the tool frame with the two halves of the alignment and pinning member coming together within the hole of the tool frame. The hook is further positioned, as by slight rotation and/or sliding of the hook along the tool frame if necessary, until the angled rear portion of the tool frame catches securely on one of the plurality of multi-size adjustment ridges or fitment guides on the inner surface of the hook. Thereafter, once the tool frame is properly positioned in the channel of the tool hook, the threaded screw-type tightening member may be tightened down on the tool to hold the hook securely on the tool frame. In this way the multi-function attachment member and tightening member, together with the alignment and pinning member, securely attach to the any of a number differently-designed tools or tool frames, and the multi-function tool and handle hook is thus pinned onto the tool and or frame by the alignment and pinning member thus preventing sliding of the hook relative to the tool when installed on the tool. A second threaded screw may also be employed, either to tighten down the engagement member onto the frame of the tool, or to pass through another hole in the frame of the tool and into a threaded receptacle on the multi-function attachment member.

The plurality of channel walls of the attachment member and tightening member of this embodiment of the invention further comprise opposing hooks adapted for releasable receipt transversely to the channel, and secure engagement of the bail or wire handle, adapted for hanging a tool, such as a bucket, a fan, or other tool with a handle, attached to the bail or wire handle.

To remove the tool hook from the tool frame, the user simply loosens the screw through the threaded tightening member until the tightening member is freed from the multi-function attachment member so that the two portions of the tool hook (the multi-function attachment member and the tightening member) may be removed. To then adapt the two portions of the tool hook for use in holding a wire or bail handle of a bucket, or another tool, the two portions are screwed back together until the two halves of the alignment and pinning member are aligned and securely positioned together. The second screw is preferably used in this instance to secure these two portions (the multifunction attachment member and the tightening member) of the tool hook in this solid position for use with a wire or bail handle, so that the two portions of the tool hook will not rotate or pivot relative to one another during this latter type of use.

The multi-function attachment member of this embodiment of the invention may further comprise a plurality of alignment and pinning members for adapting the multi-function attachment member and tightening member of the multi-function tool and handle hook to any of a number of differently-sized and positioned voids or holes defined by the any of a plurality of tools. Preferably at least one of these alignment and pinning members comprises two opposing halves of a rectangular alignment and pinning member adapted to extend through, or partially pass through, at least one of differently-sized and positioned voids or holes defined by the any of a plurality of tools, depending on positioning of the at least one tightening member relative to the multi-function attachment member upon installation of the multi-function tool and handle hook on the any of a plurality of tools. In this manner the rectangular aligning and pinning member aligns and stops excess movement of the multi-function tool and handle hook when installed on the any of a plurality of tools.

Further, the opposing halves of the rectangular aligning and pinning member stabilize a connection between the at least one tightening member and the multi-function attachment member when the multi-function tool and handle hook is not installed on a tool frame but is rather adapted for use for engagement for convenient hanging of a bail or wire handle on a bucket, fan or other tool.

In accordance with alternative embodiments of the invention, one or both of the opposing hooks of the multi-function attachment member may further comprise a secured-engagement hook adapted alternatively for releasable receipt (transversely of the parallel channel walls) and secure, but swinging pivotable engagement holding of a bail or wire handle of another tool. Further, the at least one tightening member preferably further comprises a plurality of threaded screw members releasably interconnecting the at least one tightening member and the multi-function attachment member, at least one of the plurality of threaded screw members being adapted to correspond to at least one of potentially a plurality of holes in the frame member of the any of a plurality of tools.

In accordance with another aspect of the invention, there are also provided brackets adaptable for attachment to other tools, such as skill saws, drills, impact tools, nail guns, and others. These brackets may then be used in connection with the multi-function tool and handle hook as described previously without departing from the scope of the invention as claimed.

It will be appreciated by those skilled in the art that there are various possible combinations of the above-described elements and sub-elements for various embodiments of the invention, whether such elements and sub-elements be combined in whole or in part, which may be employed without departing from the scope and spirit of the invention as claimed.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

DETAILED DESCRIPTION

Figure 1:
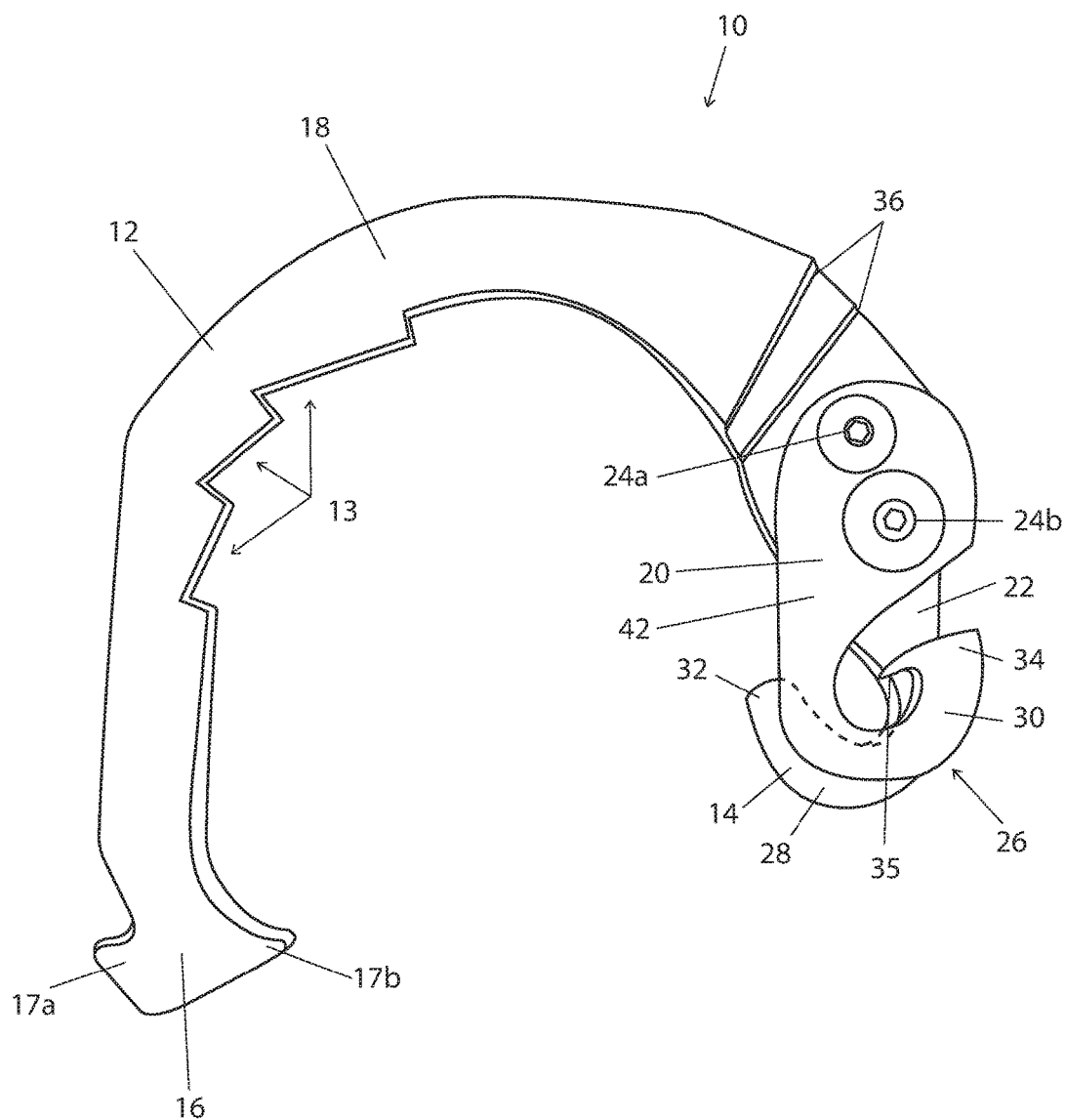
FIG. 1 is a perspective front view of a multi-function tool and handle hook in accordance with an embodiment of the invention.

Referring to FIGS. 1-3, 5-6, and 8-9, there is shown an embodiment of a multi-function tool and handle hook 10 in accordance with one or more aspects of the invention and adapted for attachment to and convenient hanging of a plurality of tools, such as any of a plurality of different brand caulking guns 50 (e.g., Cox, Albion, or Newborn brand caulking guns), a circular saw 80, or a drill 90, and alternatively releasable receipt and engagement for convenient hanging of a bail or wire handle 62 on a bucket 60, drying fan, or other tool. The tool and handle hook 10 comprises a hook member 12, which hook may be elongated or partially elongated, and having a proximal end 14, a middle portion 18, and a distal end 16, the hook member being adapted for hooking engagement adjacent the distal end on a support structure, such as for example on a step 64 of a ladder 66, a hook 52 on a pegboard, a railing (not shown) on a swing stage window washing scaffold, a structural scaffold (not shown), or other support structure.

There is further provided at least one tightening member 20 (preferably a screw-on with threaded screw members 24a, 24b, or alternatively a clamp-type, tightening member) adapted for engaging and firmly holding any of the plurality of tools 50. Further there is provided a multi-function attachment member 22 fixed to, attached to, on, or integral with, the proximal end 14 of the hook member 12. The multi-function attachment member 22 is preferably adapted for receiving and retaining for engagement with the at least one tightening member 20 (or alternatively it will be appreciated that the hook member 12 could receive and retain one or more tightening members, screw-on threaded, or otherwise), and the attachment member 22 and the at least one tightening member 20 are adapted for releasable attachment to any of a plurality of differently-configured tools 50, 80, 90, or other tools.

The multi-function attachment member 22 and the tightening member 20 in combination comprise a preferably longitudinally extending, preferably block "U"-shaped, channel 26 further comprising a plurality of parallel channel walls 28, 30 adapted for receiving and retaining one of the plurality of differently-configured tools 50, 80, 90, or other tools, by, or in, the attachment member 22 and tightening member 20 combination.

The first parallel wall 28 of the channel 26 is preferably integral with the attachment member 22. The second parallel wall 30 of the channel 26 preferably comprises the tightening member 20. There may optionally be provided a floor (not shown) of the channel 26 formed by either the attachment member 22 or the tightening member 20, or part of a floor may be provided each by the attachment member and the tightening member.

Figure 7A:
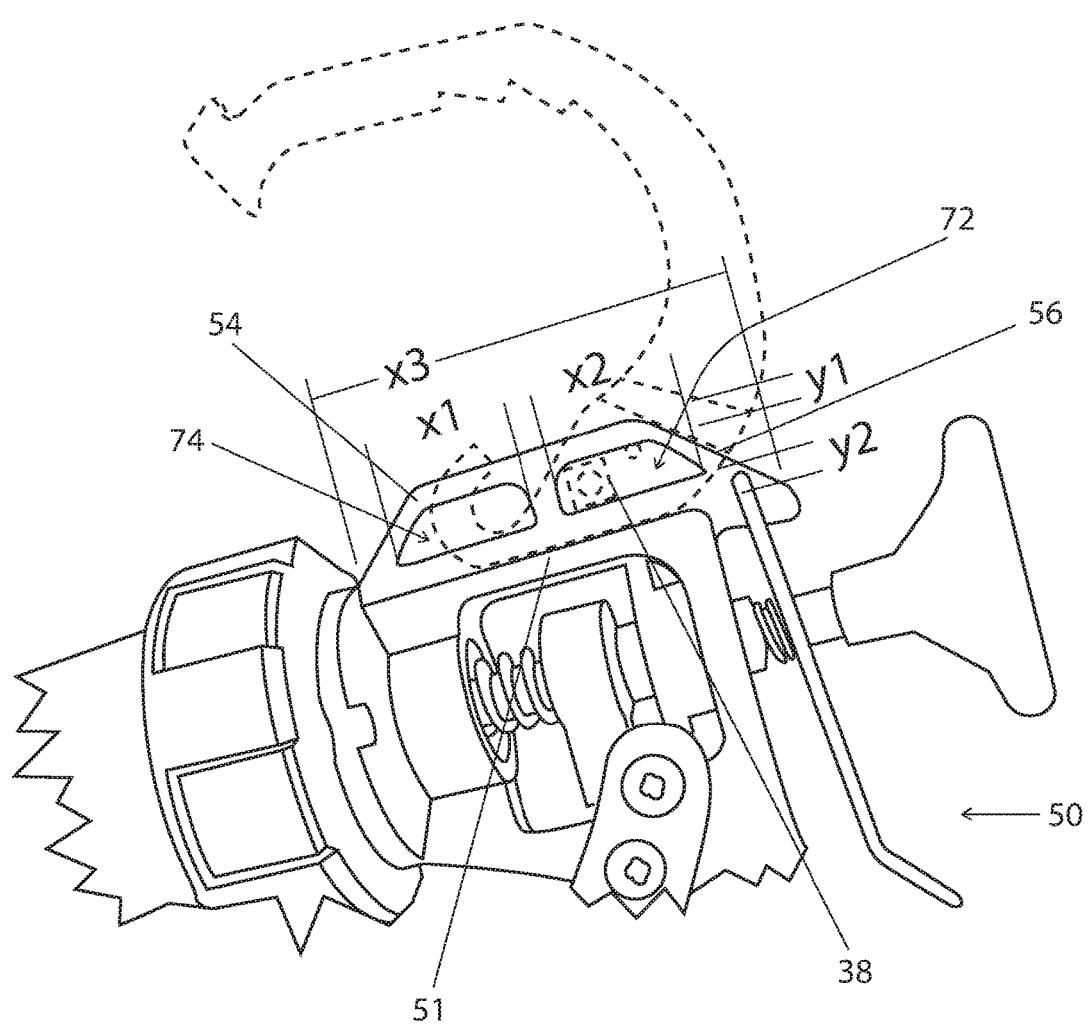
FIG. 7a is a partial illustrative side view of a caulking gun upper frame member with a phantom view of a portion of a multi-function tool and handle hook aligned therewith.
Figure 7B:
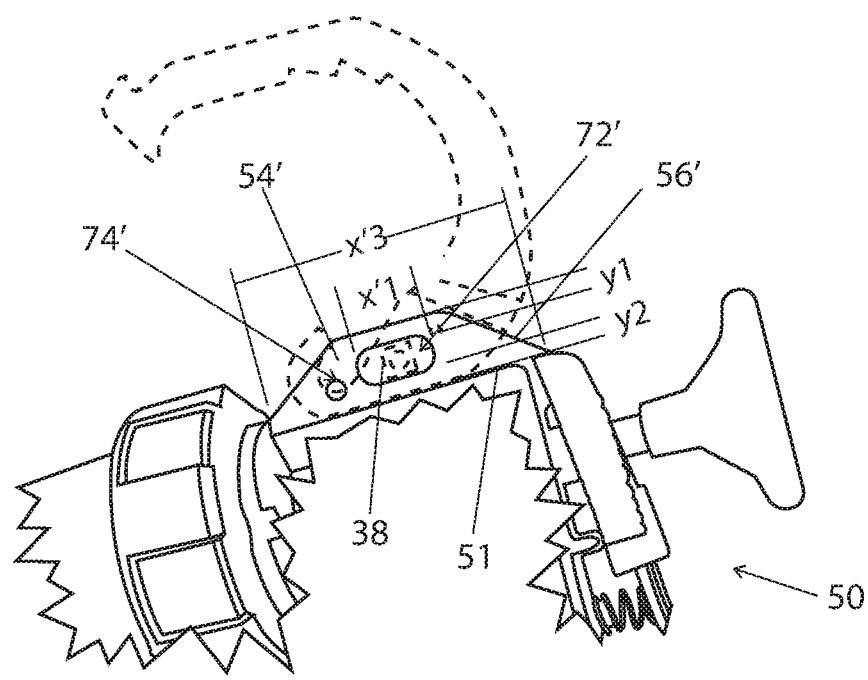
FIG. 7b is a partial illustrative side view of another type of caulking gun upper frame member with a phantom view of a portion of a multi-function tool and handle hook aligned therewith.
Figure 7C:
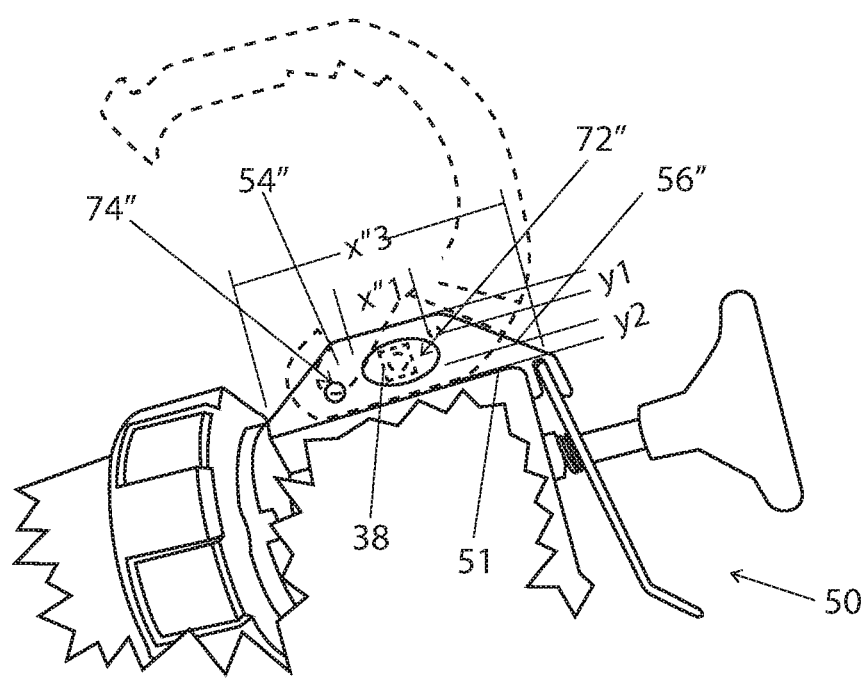
FIG. 7c is a partial illustrative side view of yet another caulking gun upper frame member with a phantom view of a portion of a multi-function tool and handle hook aligned therewith.

Referring additionally to FIGS. 7A-C, the aforementioned plurality of parallel channel walls 28, 30 of the attachment member 22 and tightening member 20 combination further comprise opposing hooks 32, 34, respectively. Thus, by way of the channel walls 28, 30, or their respective opposing hooks 32, 34, the multi-function tool and handle hook 10 is alternatively adapted for releasably fixed, rigid, temporarily non-moveable, attachment to a tool 50, 80, 90, or other tool, such as to a frame 54, 54', 54" of a caulking gun 50, and releasable receipt (transversely of said parallel walls 28, 30) and secure, but swinging, or in other words pivoting or pivotable, engagement and hanging of the bail or wire handle 62 of another tool—for example for enabling hanging of the wire handle 62 of a bucket 60.

In accordance with another aspect of the invention, the multi-function attachment member 22 of the multi-function tool and handle hook 10 preferably further comprises a plurality of multi-angled and sized engagement ridges or edges 36 adapted for multi-size and multi-angled fitment and adjustment on any of a plurality of tools 50 for engaging differently-angled frames, or brackets, 54, 54', 54" of different tools.

This aspect of the invention makes the multi-function tool and handle hook 10 readily adaptable for secure attachment to any of a number of differently-shaped frames 54, 54', 54" on a tool 50, 80, 90 such as any of a number of different brands of caulking guns 50, circular saws 80, drills 90, or other tools, having differently-angled frame rear-angle 56, 56', 56" or other, portions.

In accordance with another aspect of the invention, the multi-function attachment member 22 and tightening member 20 combination further comprises at least one alignment member 38 for successfully adapting the multi-function attachment member 22 and tightening member 20 combination of the multi-function tool and handle hook 10 to a void 72, 72', 72" (FIGS. 5 and 7A-C), or one or more differently-sized and positioned voids or holes 72, 72', 72", 74, 74', 74", defined by the any of a plurality of differently-designed tool bracket frame members 54, 54', 54" (such as for example those of different brands from different manufacturers of caulking guns 50, saws 80, drills 90, or other tools). This aspect of the invention makes the multi-function tool and handle hook 10 adaptable to a larger number of differently-designed and manufactured tools, since the alignment member 38 extends through, or partially passes through, at least one of the void or voids 72, 72', 72", 74, 74', 74" in a tool or tool frame member 54, 54', 54".

Figure 4:
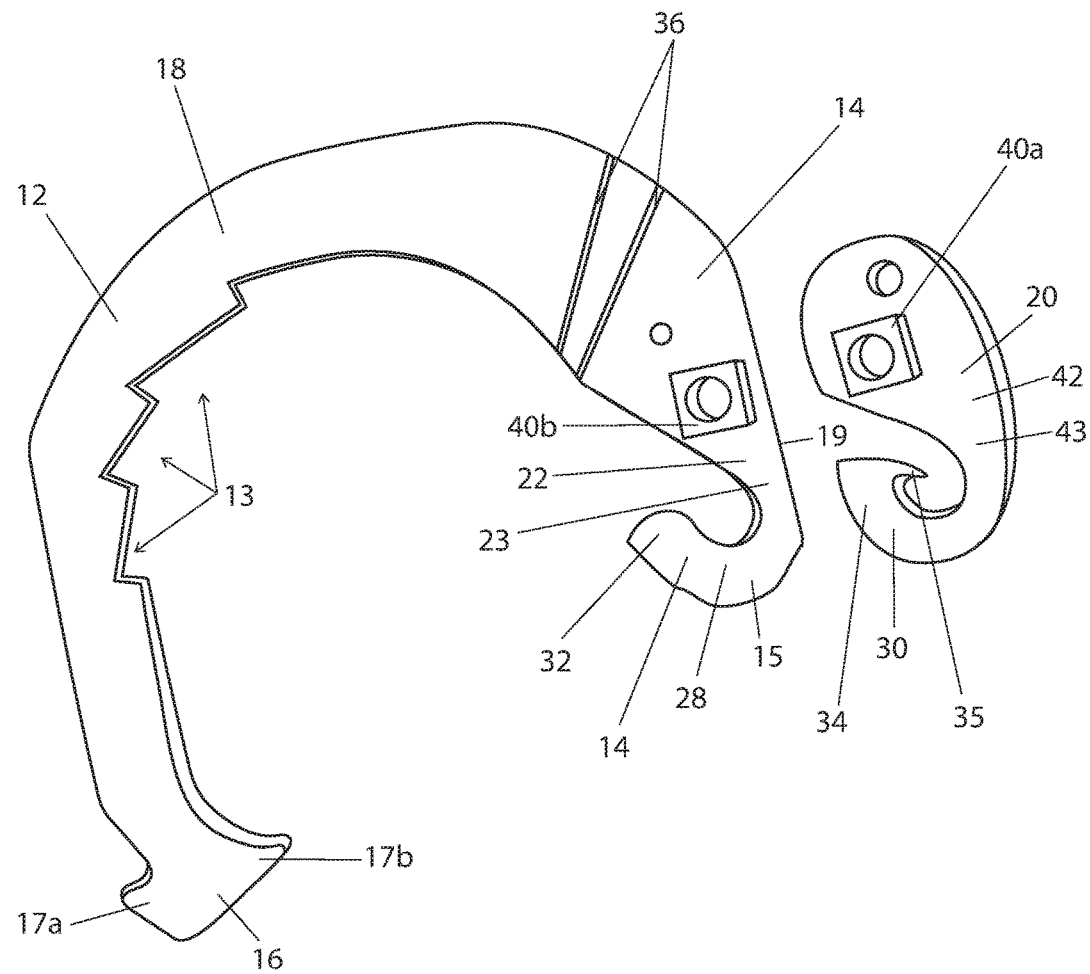
FIG. 4 is an exploded front and inner perspective view of portions of the multi-function tool and handle hook of FIG. 1.
Figure 5:
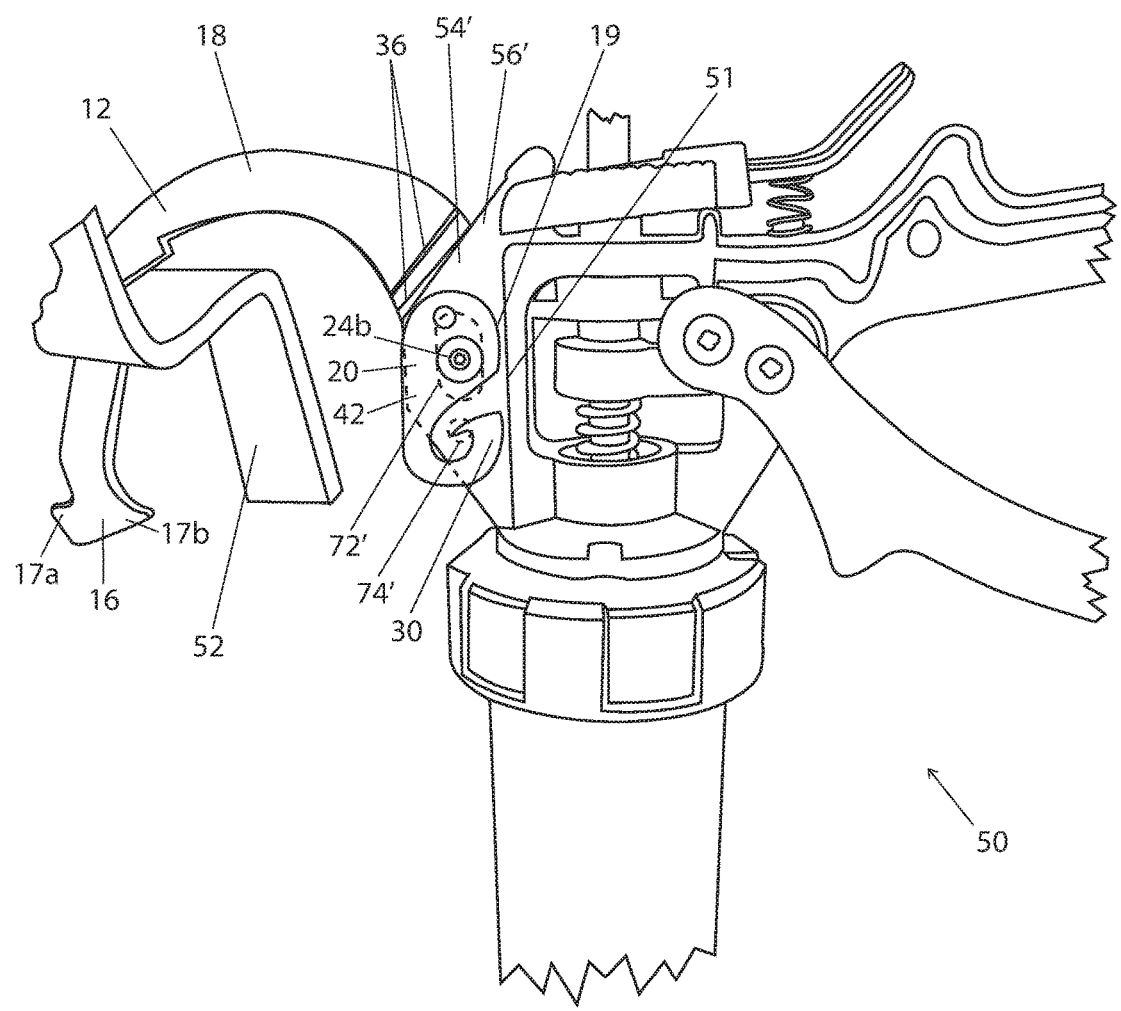
FIG. 5 is an illustrative front view of a multi-function tool and handle hook installed on a caulking gun frame in accordance with an aspect of the invention.

Preferably, in accordance with an embodiment of the invention, the at least one tightening member 20 comprises an engagement member 42 having an inner surface 43 for engaging the frame 54, 54', 54" of a tool 50, 80, 90 and at least one threaded screw member 24b, but preferably a plurality of threaded screw members 24a, 24b, releasably interconnecting the engagement member 42 of the at least one tightening member 20 and the multi-function attachment member 22, at least one of the plurality of threaded screw members 24a, 24b adapted to extend through, or pass partially through, or correspond (e.g., threaded screw member 24b as shown in FIG. 5) to one or more voids 72, 72', 72", 74, 74', 74", or a plurality of holes, in the frame member 54 upon installation of the multi-function tool and handle hook 10 on any of the any of a plurality of tools. The multi-function attachment member 22 also has an opposing inner surface 23 opposing inner surface 43 of engagement member 42 of tightening member 20 (see FIG. 4).

Figure 2:
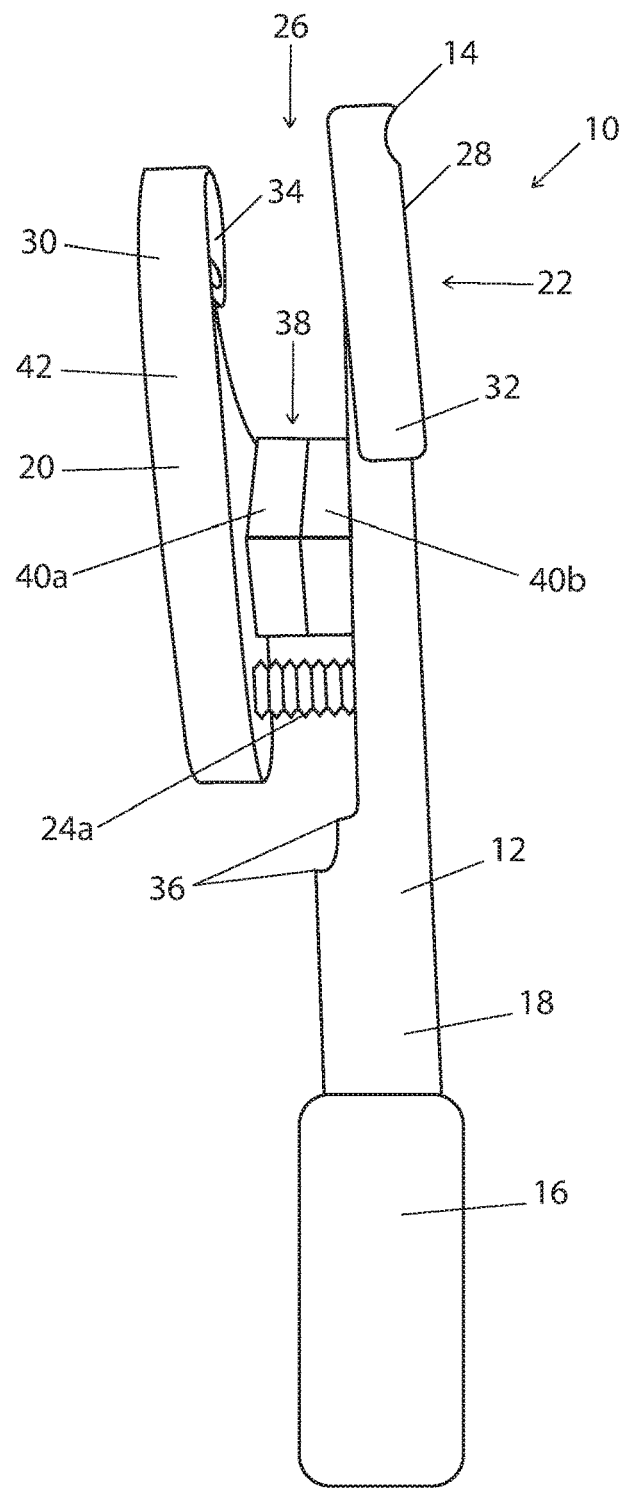
FIG. 2 is a perspective right-side view of the multi-function tool and handle hook of FIG. 1.

Preferably, as shown in FIGS. 2 and 4, the at least one alignment member 38 further comprises two opposing halves 40a, 40b of a rectangular alignment member 38 adapted to pass through at least one of differently-sized and positioned void, voids or holes 72, 72', 72", 74, 74', 74" defined by the any of a plurality of tools 50, 80, 90, or any of their frames 54, 54', 54" upon installation of the multi-function tool and handle hook 10 on the any of a plurality of tools, and depending upon positioning of the alignment member 38 so as to correspond with, extend through, or pass partially through the at least one of differently-sized and positioned void, voids or holes.

Figure 6:
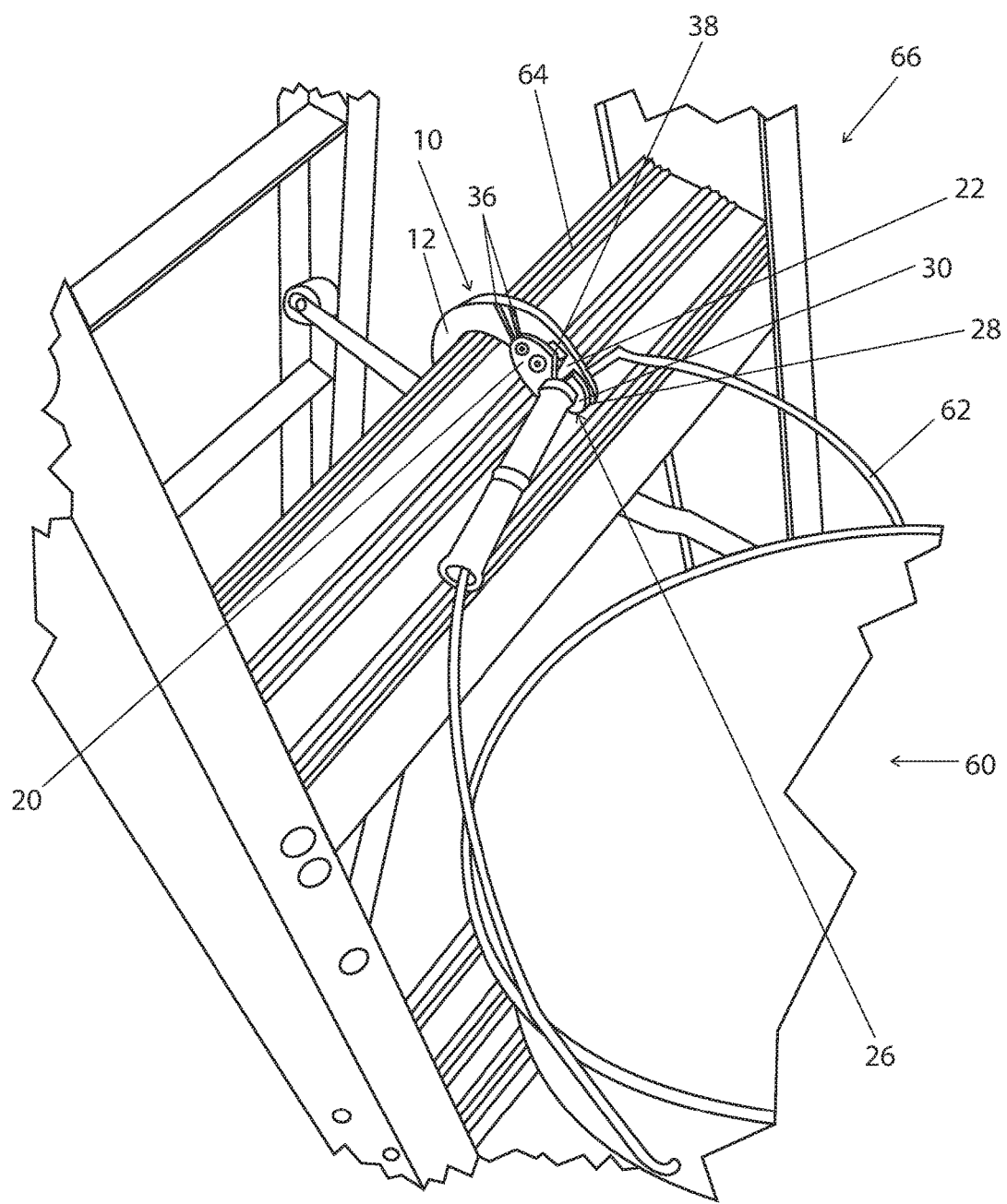
FIG. 6 is an illustrative view of a multi-function tool and handle hook installed on a bucket handle in accordance with another aspect of the invention.

This embodiment makes the multi-function tool and handle hook 10 more adaptable to be securely fastened to the any of a plurality of differently-designed tools 10. Further, this embodiment enables a clam-shell like configuration of the multi-function attachment member 22 and the tightening member 20 adaptable for secure, rigid and fixed attachment to the any of a plurality of tools 50, 80, 90 while at the same time further being adapted for enabling the multi-function tool and handle hook 10 to function as a solid unit with the two halves 40a, 40b of the rectangular alignment member 38 tightened together (when the hook 10 is not otherwise attached to a tool such as shown in FIG. 6) to be adapted to enable secure gripping and retaining of a wire handle 62 of a bucket 60, wire frame drying fan, or other tool.

Figure 3:
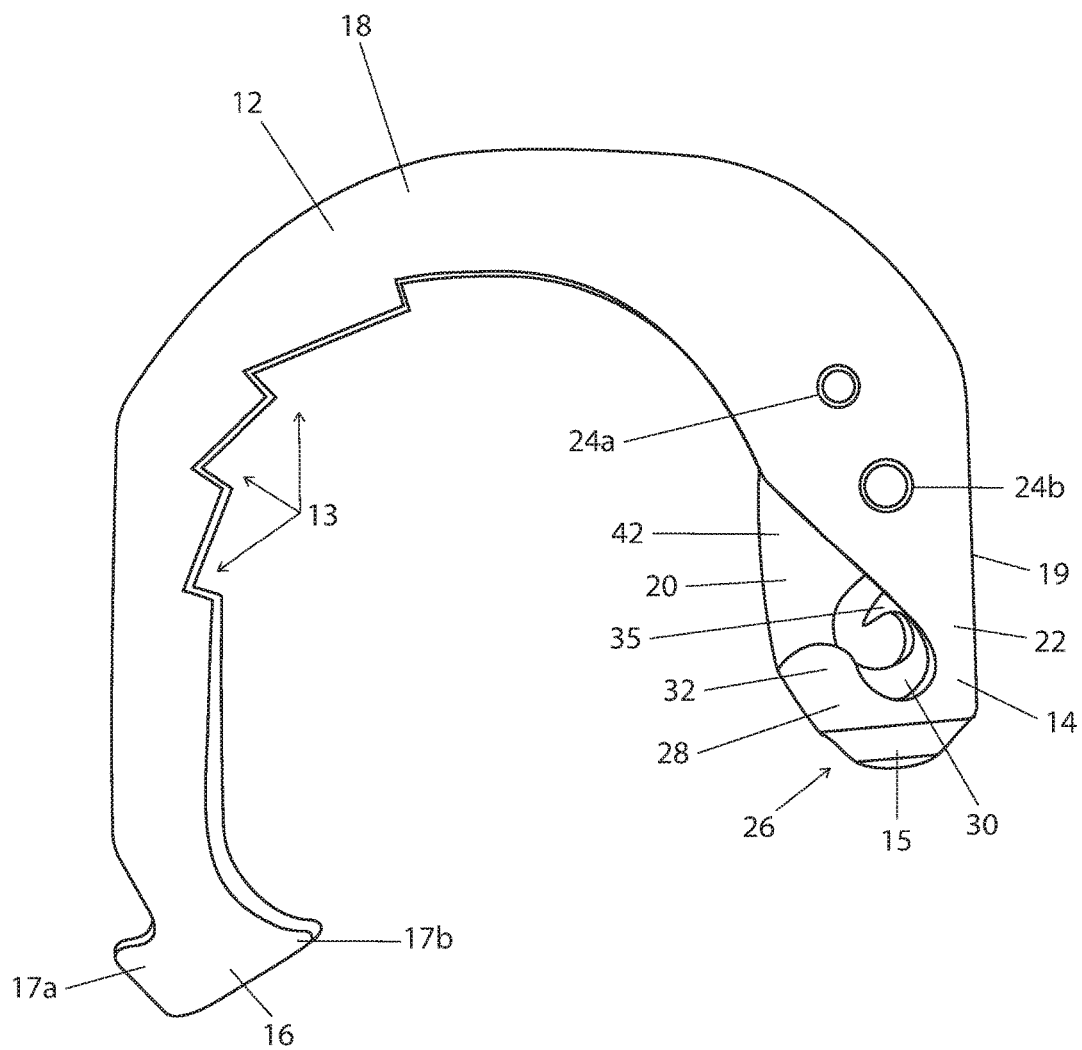
FIG. 3 is a perspective rear view of the multi-function tool and handle hook of FIG. 1.

In a preferred embodiment, the multi-function tool and handle hook 10 is provided wherein at least one of the opposing hooks 32, 34 of said multi-function attachment member 22 and tightening member 20 combination further comprises a secured-engagement hook extension 35, in that it may have an additional pointed hooking tip thereon, for better hooking and holding the bail or wire handle 62. This aspect of the invention helps ensure that the hook (e.g., 34, 35 as shown in FIGS. 3 and 4) will remain engaged on the bail or wire handle 62 for improved safety and stability of engagement of a bucket 60 (as shown in FIG. 6), wire frame fan, or other tool, for example on an elevated platform (not shown) where dropping a tool could be hazardous, or at least very inconvenient.

Preferably, the distal end 16 of the hook member 12 further comprises a counter-hook 17a, 17b for engaging an inner edge of an internal void or hole defined in the support structure to prevent dislodging of the multi-function tool and handle hook 10 from the support structure. This, of course, enhances the safety of the multi-function tool and handle hook 10 so as to help prevent dislodgement of the same from a hole in the support structure, such as for example a hole (not shown) defined in the top step of an A-frame-type, free-standing, step ladder.

Further, the hook 12 of the multi-function tool and handle hook 10 further comprises a serrated inner edge 13. The serrated inner edge 13 assists the multi-function tool and handle hook 10 to remain engaged with the support structure (e.g., pegboard hook 52 of FIG. 5, step 64 of a step-ladder of FIG. 6, or a railing of a scaffolding or swing stage—not shown.) This improves the safety of the multi-function tool and handle hook 10 to help prevent falling of a tool otherwise held in place by the hook 10.

The multi-function tool and handle hook 10 serves both as a hook for any of a plurality of tools 50, 80, 90, and separately as a hook that may also be readily installed in the field on a bail or wire handle 62, such as for example for a bucket 60. This latter use is accomplished by substantially aligning the bail or wire handle 62 longitudinally with a line parallel to the channel 26 formed by the channel walls 28, 30 formed by the multi-function attachment member 22 and tightening member 20 combination. Thereafter, completion of installation on the bail or wire handle 62 is further secured and accomplished by rotating the bail or wire handle towards a transverse, or perpendicular, orientation of the bail or wire handle relative to the parallel channel walls 28, 30, so as to be retained within the opposing hooks 32, 34 (and 35) for holding of the bail or wire handle.

Thus, there is provided a multi-function tool and handle hook 10 adapted for more rigid attachment to and convenient hanging of a plurality of tools 50, 80, 90 and/or releasable receipt and pivotable, swinging, engagement of a bail or wire handle 62 on a bucket 60, wire frame fan, or other tool. As shown in FIGS. 1, 3 and 4, this is made possible since at least one wall 28, 30 of the longitudinally extending channel 26 further comprises opposing hooks 32, 34. As shown in FIGS. 5, 6, 7A-C, and 8-9, the multi-function tool and handle hook 10 is adapted alternatively for receiving and releasably fixed, rigded, temporarily non-moveable, retaining and attachment to one of a plurality of differently-configured tools 50, 80, 90, such as to the frame 54, 54', 54" of one of several brands of caulking guns 50, and alternatively releasable and transverse receipt and secure, but swinging, pivoting, or pivotable engagement holding of the bail or wire handle 62 of another tool, such as the wire handle of a bucket 60.

Thus, the multi-function attachment member 22 and the at least one tightening member 20, when combined and screwed together with threaded screw members 24a, 24b, also form a longitudinally extending channel 26 comprising a plurality of parallel channel walls 28, 30 adapted for receiving and retaining one of a plurality of differently-configured tools 50, 80, 90 in the channel formed by the attachment member and the at least one tightening member. The first wall 28 of the channel 26 is preferably integral with the multi-function attachment member 22, and the second wall 30 of the channel is preferably formed by the tightening member 20. The multi-function attachment member 22 of this embodiment of the invention further comprises a plurality of multi-size adjustment ridges, ledges, fitment guides 36 on an inner surface 23 of the tool hook adjacent the multi-function attachment member and adapted for engaging and securely holding differently-angled frames 54, 54', 54" of a tool.

Thus, in order to install the multi-function tool and handle hook 10 on the frame 54, 54', 54" of a tool 50, 80, 90, such as on the frame of a caulking gun, saw, or drill, respectively, the multi-function attachment member 22 at the proximal end 14 of the hook member 12 is laid against the frame of the tool such that the hook member rests on a ledge 51 of the tool frame, or is positioned slightly above the ledge 51 of the tool frame, depending on the type of tool frame, and such that a portion (e.g., ½) of an alignment and pinning member 38, comprising rectangular member 40b fixed to the attachment member, aligns with a hole 72, 72', 72", 74, 74', 74" in the tool frame 54, 54', 54". The tightening member 20 is placed on the other side of the frame 54, 54', 54" of the tool 50, 80, 90 opposite the multi-function attachment member 22, the attachment member and the tightening member thus forming a channel 26 in which the tool frame rests. The first half 40b of the alignment and pinning member 38 is fixed to the multi-function attachment member 22, and there is provided another half 40a of the rectangular (cubical) alignment and pinning member 38 fixed on the tightening member 20 opposite and corresponding with the first half 40b of the rectangular alignment and pinning member 38. The threaded screw member 24b adapted for passing through the tightening member, 20, two rectangular halves 40a, 40b of the rectangular alignment and pinning member 38, or alignment guide, and then also through the multi-function attachment member 22. Thus, when screwed together, the multi-function attachment member 22 and the tightening member 20 are screwed together to form a solid unit (whether on the frame of a tool or not). When the tool hook 10 is installed on the frame 54, 54', 54" of a tool 50, 80, 90, the two corresponding halves 40a, 40b of the alignment and pinning member 38 are adapted to reside at least partially within a hole 72, 72', 72", 74, 74', 74" of the tool frame 54, 54', 54". Thus, the two halves 40a, 40b of the alignment and pinning member 38 are aligned such that the threaded screw 24b of the tightening member 20 is adapted to pass through the tightening member, through the first and second halves 40a, 4b, of the rectangular alignment member 38, and thus through the hole 72, 72', 72", 74, 74', 74" of the frame 54, 54', 54" of the tool 50, 80, 90, with the frame of the tool aligned longitudinally with the channel 26, and then also with the threaded screw member 24b screwing into the attachment member 22 opposite the tightening member 20 (whether or not installed on a tool and/or its frame). Before completely tightening the tightening member 20 clamping on the frame 54, 54', 54" of the tool 50, 80, 90, the tool hook 10 is adjusted relative to the frame of the tool so that a rear angled portion 56, 56', 56" of the frame of the tool rests against one of the plurality of angled fitment guides or ledges 36 on the inner surface of the tool hook on or adjacent the multi-function attachment member 22.

Once the frame 54, 54', 54" of the tool 50 is inserted into the channel 26 until an edge 19 of the hook 12 rests on a ledge, or shelf, 51 on the tool frame, or just above the shelf 51 of the tool frame, the tool frame is positioned in the channel such that the threaded screw 26b of the screw-type tightening member 20 is enabled to pass through a hole 72, 72', 72", 74, 74', 74" in the tool frame with the two halves 40a, 40b of the alignment and pinning member 38 coming together within the hole of the tool frame. The tool hook 10 is further positioned, as by slight rotation and/or sliding of the hook along the tool frame 54, 54', 54" until the angled rear portion 56, 56', 56" of the tool frame catches on one of the plurality of multi-size adjustment ridges or fitment guides 36 on the inner surface 23 of the attachment member 22. Thereafter, once the tool frame 54, 54', 54" is properly positioned in the channel 26 of the tool hook 10, the threaded screw-type tightening member 24b, and or 24a, may be tightened down on the tool 50, 80, 90 to hold the hook securely on the tool frame. In this way the multi-function attachment member 22 and tightening member 20, together with the alignment and pinning member 38, securely attach to the any of a number differently-designed tools 50, 80, 90 or tool frames 54, 54', 54", and the multi-function tool and handle hook 10 is thus pinned onto the tool and or frame by the alignment and pinning member 38, thus preventing sliding of the hook relative to the tool when installed on the tool.

The plurality of channel walls 28, 30 of the attachment member 22, and tightening member 20, respectively, of this embodiment of the invention further comprise opposing hooks 32, 34 adapted for releasable receipt transversely to the channel 26, and secure engagement of the bail or wire handle 62, adapted for hanging a tool attached to the bail or wire handle.

To remove the tool hook 10 from the tool frame 54, 54', 54", the user simply loosens the screw 24b through the threaded tightening member 20 until the tightening member is freed from the multi-function attachment member 22 so that the two portions of the tool hook 10 (the multi-function attachment member 22 and the tightening member 20) may be removed. To then adapt the two portions of the tool hook 10 for use in holding a wire or bail handle of a bucket 62, fan, or another tool, the two portions are screwed back together until the two halves 40a, 40b of the alignment and pinning member 38 are aligned and securely positioned together.

A second screw 24a is also provided to secure these two portions (the multifunction attachment member 22 and the tightening member 20) of the tool hook 10 in this solid position for use with a wire or bail handle 62, so that the two portions of the tool hook will not rotate or pivot relative to one another during this latter type of use. This second screw 24a may also be used to tighten the tool hook 10 onto the frame of a tool, such as by tightening down on the frame of the tool. Or, if such a second screw 24a passes through a hole in a particular frame member, it is thereafter received by and in a threaded hole in the multi-function attachment member 22.

The multi-function attachment member 22 of this embodiment of the invention may further comprise a plurality of alignment and pinning members 38 (or threaded screw 24a) for adapting the multi-function attachment member 22 and tightening member 20 of the multi-function tool and handle hook 10 to any of a number of differently-sized and positioned voids or holes 72, 72', 72", 74, 74', 74" defined by the any of a plurality of tools 50, 80, 90. Preferably at least one of these alignment and pinning members 38 comprises two opposing halves 40a, 40b of a rectangular alignment and pinning member 38 adapted to extend through, or partially pass through, at least one of differently-sized and positioned voids or holes 72, 72', 72", 74, 74', 74" defined by the any of a plurality of tools 50, 80, 90 depending on positioning of the at least one tightening member 20 relative to the multi-function attachment member 22 upon installation of the multi-function tool and handle hook 10 on the any of a plurality of tools. In this manner the rectangular aligning and pinning member 38 aligns and stops excess movement of the multi-function tool and handle hook 10 when installed on the any of a plurality of tools 50, 80, 90, the opposing halves 40a, 40b of the rectangular aligning and pinning member 38 also stabilizing a connection between the at least one tightening member 20 and the multi-function attachment member 22 when the multi-function tool and handle hook is not installed on a tool but is adapted for use for engagement for hanging of a bail or wire handle 62 on a bucket 60 or other tool.

Further, the opposing halves 40a, 40b of the rectangular aligning and pinning member 38 stabilize a connection between the at least one tightening member 20 and the multi-function attachment member 22 when the multi-function tool and handle hook 10 is not installed on a tool frame 54, 54', 54" but is rather adapted for use for engagement for convenient hanging of a bail or wire handle 62 on a bucket 60, fan, or other tool.

In accordance with alternative embodiments of the invention, one or both of the opposing hooks 32, 34 of the multi-function attachment member 22 may further comprise a secured-engagement hook 35 adapted alternatively for releasable receipt (transversely of the parallel channel walls 28, 30) and secure, but swinging, pivotable engagement holding of a bail or wire handle 62 of another tool. Further, the at least one tightening member preferably further comprises a plurality of threaded screw members 24a, 24b releasably interconnecting the at least one tightening member 20 and the multi-function attachment member 22, at least one of the plurality of threaded screw members being adapted to correspond to at least one of potentially a plurality of holes 72, 72', 72", 74, 74', 74" in the frame member 54, 54', 54" of the any of a plurality of tools 50, 80, 90.

It will be appreciated by those skilled in the art that there are various possible combinations of the above-described elements and sub-elements for various embodiments of the invention, whether such elements and sub-elements be combined in whole or in part, which may be employed without departing from the scope and spirit of the invention as claimed.

As shown in FIGS. 3 and 4, there is provided at the proximal end 14 of the hook member 12 a prying structure 15 thereon for opening can or bucket lids. Such provision is beneficial, since a user has the prying structure 15 readily available for use, exactly when needed before applying the multi-function tool and handle hook 10 to support a bucket 60 (for example a bucket of paint). Since the multi-function tool and handle hook 10 is relatively smooth on the outside and curved, it easily fits within the palm of a user's hand for comfortably applying leverage to open a paint can lid, or other bucket lid, using prying structure 15. Further, since channel wall 28 of multi-function attachment member 22 is longer than channel wall 30 of tightening member 20, upon applying leverage to pop the lid of a paint can, the shorter wall 30 hits the side of the can and provides a leverage point for more easily popping the top of the lid of the can off.

Referring to FIGS. 7A-C, there are shown three different types of brackets 54, 54', 54" which are commonly available on different caulking gun tools 50. Each of these brackets 54, 54', 54" are typically, and preferably, comprised of metal. Referring specifically to bracket 54 in FIG. 7A, there are two elongated holes, spaces, or voids 72, 74 defined in the bracket. The hole 72 appears as a mirror image of hole 74 along a generally vertical axis, such that measurement y3 is generally the same for each hole. Each of holes 72, 74 are roughly rectangular at the ends thereof closest to each other, and roughly pointed at the ends further from each other. Thus, holes 72, 74 are polygon-shaped, but with unequal angles and sides. Also shown are vertical measurements y1 and y2. Measurement y1 is the distance from the top of the holes 72, 74 to the top of the bracket 54, whereas measurement y2 is the distance from the bottom of the holes to a frame member ledge 51. The multi-purpose attachment member 22 may rest on the frame member ledge 51, or not, but alignment member 38, upon installation of the hook 10, just fits (in the vertical dimension—but is free to slide in the horizontal dimension until tightening occurs) within hole 72 as shown, such that the alignment members 38, 40 prevent generally vertical travel of the hook 10 relative to the hole 72 and bracket 54 when fully installed and tightened.

Referring still specifically to FIG. 7A, measurement x1 is the overall length of hole 74, and measurement x2 is the overall length of hole 72, whereas measurement x3 is the overall length of the bracket 54. Alignment members 38, 40 also prevent generally horizontal travel of the tool hook 10 relative to the bracket 54, especially during installation of the tool hook before tightening, since the alignment members prevent traveling of the alignment members rearwardly within hole 72 beyond the back portion of the hole, and therefore this also prevents traveling of the multi-function attachment member 22 of the hook from traveling beyond a back portion 78 of bracket 54. Not only does this prevent the hook 10 from falling off of the tool 50 bracket 54, but this enables the user during installation of the hook 10 to lightly thread the screw 24b into the other half 40 of alignment member combination 38, 40 to allow adjustment of the multi-function attachment member 22, and thus tool hook 10, relative to the tool and bracket until one of the back edges 56 of the bracket comes to rest against one of the alignment guides 36 as shown. In this way, with the alignment member combination 38, 40 tightened with screw 24b of tightening member 20, with an alignment guide 36 of tool hook 10 snugged up to the back edge 56 of the bracket, the tool hook is held tightly in place on the tool 50 bracket 54.

To further secure the connection, the optional additional screw 24a may be tightened down onto a surface of the bracket 54, or optionally it may pass through another hole (for example hole 72 of FIG. 7A) in the bracket and into a threaded receiving hole in the multi-function attachment member 22. In this way, the tool hook 10 may be securely tightened onto any of a plurality of different tools 50 brackets 54, 54', 54" for use in hanging the tool on a support structure for hand's free work. Further, the tool hook 10 may be removed from the bracket 54 for use with hanging a tool, such as a bucket 60 (see FIG. 6), drying fan, or other tool.

Referring now specifically to bracket 54' in FIG. 7B, there is one rearwardly defined elongated hole, space, or void 72' and one forwardly defined circular hole, space, or void 74' defined in the bracket. The hole 72' is stadium-shaped, and the hole 74' is circular. Measurement y3, the height of the stadium-shaped hole 72', is generally the same as for 72' as it is for 72 (and 72" also). Also shown are vertical measurements y1 and y2, which are roughly equal to the measurements y1 and y2 of bracket 54 of FIG. 7A.

In FIG. 7B, measurement y1 is the distance from the top of the hole 72' to the top of the bracket 54', whereas measurement y2 is the distance from the bottom of the hole 72' to a frame member ledge 51. The multi-purpose attachment member 22 may rest on the frame member ledge 51, or not, but alignment member 38, upon installation of the tool hook 10, just fits (in the vertical dimension, but in the horizontal dimension is free to slide until tightening) within hole 72' as shown, such that the alignment members 38, 40 prevent generally vertical travel of the tool hook 10 relative to the hole 72' and bracket 54' when fully installed and tightened.

Referring still specifically to FIG. 7B, measurement x'1 is the overall length of hole 72', and measurement x'2 (not shown) would be the diameter of hole 74', whereas measurement x'3 is the overall length of the bracket 54'. Alignment members 38, 40 also prevent generally horizontal travel of the tool hook 10 relative to the bracket 54', especially during installation of the tool hook before tightening, since the alignment members prevent traveling of the alignment members rearwardly within hole 72' beyond the back portion of the hole, and therefore this also prevents traveling of the multi-function attachment member 22 of the tool hook from traveling beyond a back portion 78' of bracket 54'. Not only does this prevent the tool hook 10 from falling off of the tool 50 bracket 54', but this enables the user during installation of the tool hook 10 to lightly thread the screw 24b into the other half 40 of alignment member combination 38, 40 to allow adjustment of the multi-function attachment member 22, and thus tool hook 10, relative to the tool and bracket until one of the back edges 56' of the bracket comes to rest against one of the alignment guides 36 of the tool hook as shown. In this way, with the alignment member combination 38, 40 tightened with screw 24b of tightening member 20, with an alignment guide 36 of tool hook 10 snugged up to the back edge 56' of the bracket, the tool hook is held tightly in place on the tool 50 bracket 54'.

To further secure the connection, the optional additional screw 24a may be tightened down onto a surface of the bracket 54'. In this way, the tool hook 10 may be securely tightened onto any of a plurality of different tools 50 brackets 54, 54', 54" for use in hanging the tool on a support structure for hand's free work. Further, the tool hook 10 may be removed from the bracket 54' for use with hanging a tool, such as a bucket 60 (see FIG. 6), drying fan, or other tool.

Referring now specifically to bracket 54" in FIG. 7C, there is one rearwardly defined elongated hole, space, or void 72" and one forwardly defined circular hole, space, or void 74" defined in the bracket. The hole 72" is generally elliptical, and the hole 74" is circular. Measurement y3, the height of the elliptical-shaped hole 72", is generally the same height as it is for 72 and 72'. Also shown are vertical measurements y1 and y2, which are roughly equal to the measurements y1 and y2 of bracket 54 of FIG. 7A and bracket 54' of FIG. 7B.

In FIG. 7C, measurement y1 is the distance from the top of the hole 72" to the top of the bracket 54", whereas measurement y2 is the distance from the bottom of the hole 72" to a frame member ledge 51. The multi-purpose attachment member 22 may rest on the frame member ledge 51, or not, but alignment member 38, upon installation of the tool hook 10, just fits (in the vertical dimension, but in the horizontal dimension may be somewhat free to slide until tightening) within hole 72" as shown, such that the alignment members 38, 40 may prevent generally vertical travel of the tool hook 10 relative to the hole 72" and bracket 54" when fully installed and tightened. Of course, it will be appreciated that if alignment members 38, 40 are somewhat smaller than the vertical height of hole 72", this would not be a problem, since upon tightening of the screw member 24b, the channel walls 30, 32 would snug up and grip side portions of the bracket 54".

Referring still specifically to FIG. 7C, measurement x"1 is the overall length of hole 72", and measurement x"2 (not shown) would be the diameter of hole 74", whereas measurement x"3 is the overall length of the bracket 54". Alignment members 38, 40 also prevent generally horizontal travel of the tool hook 10 relative to the bracket 54", especially during installation of the tool hook before tightening, since the alignment members prevent traveling of the alignment members rearwardly within hole 72" beyond the back portion of the hole, and therefore this also prevents traveling of the multi-function attachment member 22 of the tool hook from traveling beyond a back portion 78" of bracket 54". Not only does this prevent the tool hook 10 from falling off of the tool 50 bracket 54", but this enables the user during installation of the tool hook 10 to lightly thread the screw 24b into the other half 40 of alignment member combination 38, 40 to allow adjustment of the multi-function attachment member 22, and thus tool hook 10, relative to the tool and bracket until one of the back edges 56" of the bracket comes to rest against one of the alignment guides 36 of the tool hook as shown. In this way, with the alignment member combination 38, 40 tightened with screw 24b of tightening member 20, with an alignment guide 36 of tool hook 10 snugged up to the back edge 56" of the bracket, the tool hook is held tightly in place on the tool 50 bracket 54". To further secure the connection, the optional additional screw 24a may be tightened down onto a surface of the bracket 54". In this way, the tool hook 10 may be securely tightened onto any of a plurality of different tools 50 brackets 54, 54', 54" for use in hanging the tool on a support structure for hand's free work. Further, the tool hook 10 may be removed from the bracket 54" for use with hanging a tool, such as a bucket 60 (see FIG. 6), drying fan, or other tool.

Figure 8:
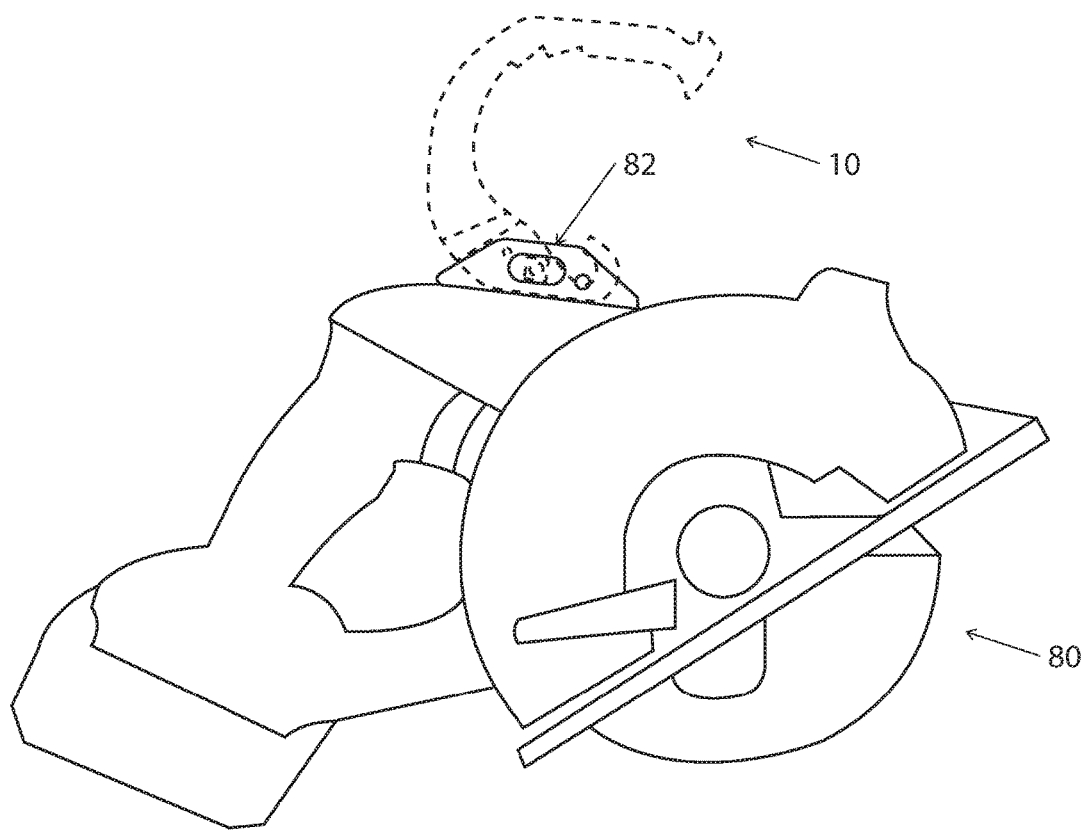
FIG. 8 is an illustrative view of a frame member attached to a circular saw with a phantom view of a portion of a multi-function tool and hook aligned therewith.
Figure 9:
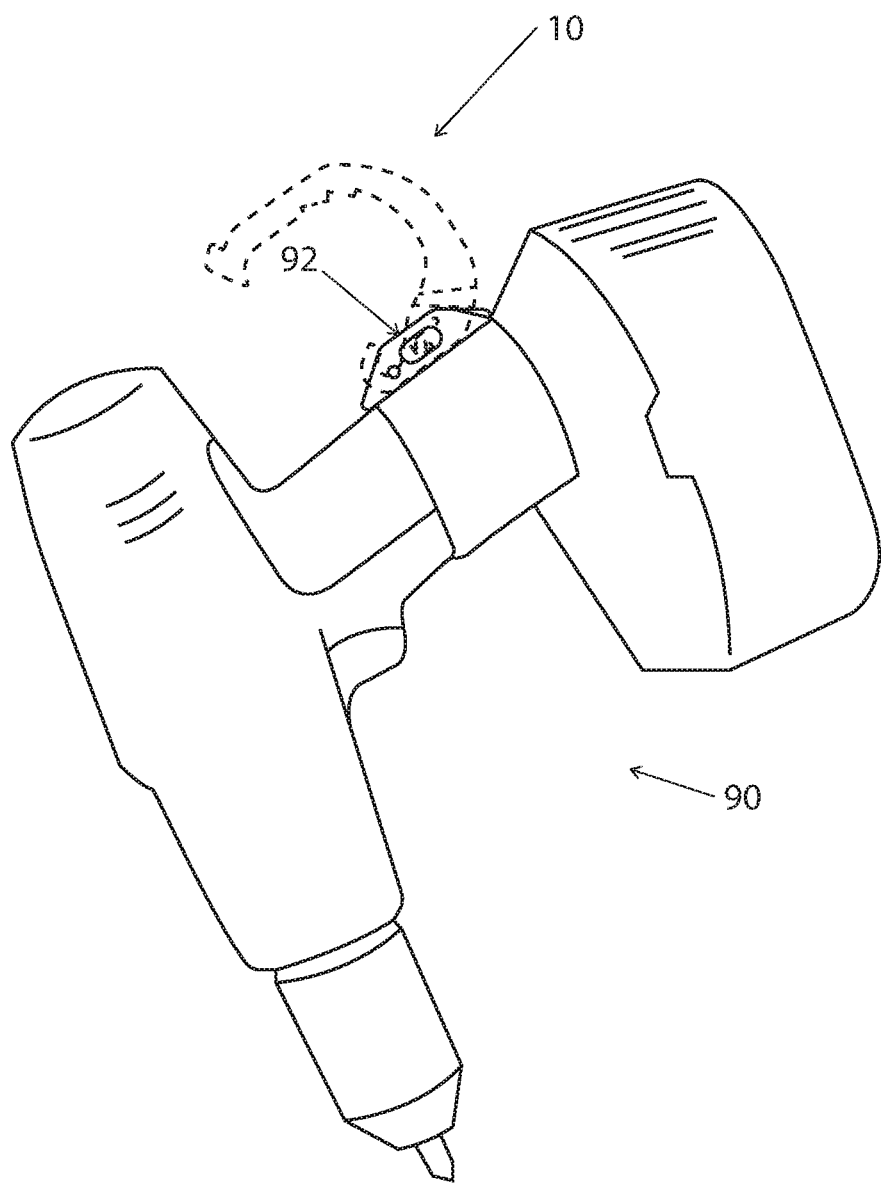
FIG. 9 is an illustrative view of a frame member attached to a portable drill with a phantom view of a portion of a multi-function tool and hook aligned therewith.

Referring specifically to FIGS. 8 and 9, in accordance with another aspect of the invention, there are provided brackets 82, 92 adaptable for attachment to the tools shown, such as a skill saw 80, or a drill-type tool 90. Brackets 82, 92 may be used in connection with the multi-function tool and handle hook 10 as described previously herein without departing from the scope of the invention as claimed.

While a preferred embodiment of the present invention has been shown and described, it will be apparent to those skilled in the art that many changes and modifications may be made without departing from the invention in its broader aspects. For example, it will be appreciated that one of ordinary skill in the art may mix and match the various components of the various embodiments of the invention without departing from the true spirit of the invention as claimed. Thus, by way of example, it will be appreciated that rounded corner alignment guide and pinning members, instead of rectangular such members 40a, 40b may be used, a single threaded screw member 24b or plural threaded screw members 24a, 24b may be used, and the prying structure 15 may be located on either end, distal end 16, or proximal end 14, of the hook member 12. The appended claims are therefore intended to cover all such changes and modifications as fall within the true spirit and scope of the invention.

What is claimed is:

1. A multi-function tool and handle hook adapted for attachment to and hanging of any of a plurality of tools and alternatively releasable receipt and engagement for hanging of a bail or wire handle on a bucket or other tool, comprising:
    a hook member having a proximal end and a distal end and adapted for hooking engagement adjacent the distal end on a support structure;
    at least one tightening member adapted for engaging and firmly holding any one of the plurality of tools;
    a multi-function attachment member fixed to the proximal end of said hook member, said attachment member adapted for engaging with said at least one tightening member, said attachment member and said at least one tightening member adapted for releasable attachment to any of a plurality of differently-configured tools said attachment member and tightening member comprising a channel comprising a plurality of parallel channel walls adapted for receiving and retaining one of a plurality of differently-configured tools in said attachment member, wherein a first wall of the channel is integral with the attachment member, wherein a second wall of the channel comprises said tightening member, and wherein the plurality of channel walls of said attachment member and said at least one tightening member further comprise opposing hooks adapted for releasable receipt and secure engagement of the bail or wire handle for hanging of a tool by the bail or wire handle.

2. The multi-function tool and handle hook of claim 1, wherein said multi-function attachment member further comprises a plurality of multi-size adjustment ridges adapted for engaging differently-angled brackets of different tools.

3. The multi-function tool and handle hook of claim 2, wherein said multi-function attachment member and tightening member each further comprises at least one alignment member for adapting said multi-function attachment member of the multi-function tool and handle hook to a void or any of a number of differently-sized and positioned voids or holes defined by the any of a plurality of tools.

4. The multi-function tool and handle hook of claim 3, wherein the at least one alignment member further comprises two opposing halves of a rectangular alignment member adapted to pass through at least one of differently-positioned voids or holes defined by the any of a plurality of tools upon installation of the multi-function tool and handle hook on the any of a plurality of tools.

5. The multi-function tool and handle hook of claim 3, wherein at least one of the opposing hooks of said multi-function attachment member and at least one tightening member further comprises a secured-engagement hook extension for hooking the bail or wire handle.

6. The multi-function tool and handle hook of claim 5, wherein the opposing hooks of said multi-function attachment member each comprise a secured-engagement hook extension adapted alternatively for releasable and transverse receipt and secure, but swinging pivotable engagement holding of a bail or wire handle of another tool.

7. The multi-function tool and handle hook of claim 3, wherein the distal end of said hook member further comprises a counter-hook for engaging an inner edge of an internal void or hole defined in the support structure to prevent dislodging of the multi-function tool and handle hook from the support structure.

8. The multi-function tool and handle hook of claim 3, wherein said at least one tightening member comprises at least one threaded screw member releasably interconnecting said at least one tightening member and said multi-function attachment member, said at least one threaded screw member adapted to extend through at least one hole or void in a frame member of the any of a plurality of tools.

9. The multi-function tool and handle hook of claim 4, wherein said at least one threaded screw member releasably interconnects said at least one tightening member and said multi-function attachment member, said at least one threaded screw member being adapted to pass through a hole in a frame member of the any of a plurality of tools.

10. The multi-function tool and handle hook of claim 9, wherein said at least one threaded screw member is adapted to pass through the rectangular halves of said rectangular alignment and pinning member.

11. A multi-function tool and handle hook adapted for attachment to and hanging of any of a plurality of tools and alternatively releasable receipt and engagement for hanging of a bail or wire handle on a bucket or other tool, comprising:
 a hook member having a proximal end and a distal end and adapted for hooking engagement adjacent the distal end on a support structure, the distal end of said hook member further comprising a counter-hook for engaging an inner edge of an internal void or hole defined in the support structure to prevent dislodging of the multi-function tool and handle hook from the support structure;
 at least one tightening member adapted for engaging and firmly holding any one of the plurality of tools;
 a multi-function attachment member integral with the proximal end of said hook member, said attachment member adapted for engaging with said at least one tightening member, said attachment member and said at least one tightening member adapted for releasable attachment to any of a plurality of differently-configured tools, said at least one tightening member comprising at least one threaded screw member releasably interconnecting said at least one tightening member and said multi-function attachment member, said at least one threaded screw member adapted to correspond to or pass through at least one hole in a frame member of the any of a plurality of tools, said attachment member and said at least one tightening member comprising a channel comprising a plurality of parallel channel walls adapted for receiving and retaining one of a plurality of differently-configured tools in the channel, wherein a first wall of the channel is integral with the attachment member, wherein a second wall of the channel comprises said tightening member, and wherein the plurality of channel walls of said attachment member and tightening member further comprise opposing hooks adapted for releasable receipt and secure engagement of the bail or wire handle adapted for hanging a tool attached to the bail or wire handle, said multi-function attachment member further comprising a plurality of multi-size adjustment ridges adapted for engaging differently-angled brackets of a tool.

12. The multi-function tool and handle hook of claim 11, wherein said multi-function attachment member further comprises at least one alignment member for adapting said multi-function attachment member of the multi-function tool and handle hook to any of a number of differently-sized and positioned voids or holes defined by the any of a plurality of tools.

13. The multi-function tool and handle hook of claim 12, wherein said multi-function attachment member and said at least one tightening member each comprises inner and outer surfaces, and wherein said alignment member further comprises a rectangular aligning and pinning member further comprised of two rectangular halves, one rectangular half extending from the inner surface of said multi-function attachment member and one rectangular half extending from the inner surface of said at least one tightening member, said alignment member adapted to pass through the any one of differently-sized and positioned void, voids or holes defined by the any of a plurality of tools upon installation of said tightening member and said multi-function attachment member of the multi-function tool and handle hook on the any of a plurality of tools, said rectangular aligning and pinning member aligning and stopping excess movement of the multi-function tool and handle hook on the any of a plurality of tools, the opposing halves of the rectangular aligning and pinning member stabilizing a connection between said at least one tightening member and said multi-function attachment member when the multi-function tool and handle hook is not installed on a tool but is adapted for use for engagement for hanging of a bail or wire handle on a bucket or other tool.

14. The multi-function tool and handle hook of claim 13, wherein at least one of the opposing hooks of said multi-function attachment member and tightening member further comprises a secured-engagement hook extension for hooking the bail or wire handle.

15. The multi-function tool and handle hook of claim 14, wherein the opposing hooks of said multi-function attachment member each comprise a secured-engagement hook extension adapted alternatively for releasable receipt and secure, but swinging pivotable engagement holding of a bail or wire handle of another tool.

16. The multi-function tool and handle hook of claim 14, wherein said at least one tightening member comprises at least one threaded screw member releasably interconnecting said at least one tightening member and said multi-function attachment member, said at least one threaded screw member adapted to extend through a hole in a frame member of the any of a plurality of tools.

17. The multi-function tool and handle hook of claim 16, wherein said at least one threaded screw member is adapted to extend through the rectangular halves of said rectangular alignment and pinning member.

18. A multi-function tool and handle hook adapted for attachment to and hanging of any of a plurality of tools and alternatively releasable receipt and engagement for hanging of a bail or wire handle on a bucket or other tool, comprising:
 a hook member having a proximal end and a distal end and adapted for hooking engagement adjacent the distal end on a support structure, the distal end of said hook member further comprising a counter-hook for engaging an inner edge of an internal void or hole defined in the support structure to prevent dislodging of the multi-function tool and handle hook from the support structure, one of the proximal end and the distal end of said hook member further comprising a prying structure thereon for opening can or bucket lids;

at least one tightening member adapted for engaging and firmly holding any one of the plurality of tools, said tightening member further comprising at least one threaded screw member releasably interconnecting said at least one tightening member and said multi-function attachment member, at least one of said at least one threaded screw member adapted to extend through a hole in a frame member of the any of a plurality of tools;

a multi-function attachment member fixed to the proximal end of said hook member, said attachment member adapted for engaging with said at least one tightening member, said attachment member and said at least one tightening member adapted for releasable attachment to any of a plurality of differently-configured tools, the at least one threaded screw member of said at least one tightening member releasably interconnecting said at least one tightening member and said multi-function attachment member, the at least one threaded screw member adapted to pass through a hole or void in a frame member of the any of a plurality of tools, said multi-function attachment member and tightening member combination further comprising opposing halves of a rectangular alignment and pinning member for positioning said multi-function attachment member and said at least one tightening member of the multi-function tool and handle hook on any of a number of differently-sized and positioned void, voids or holes defined by the any of a plurality of tools, said opposing halves of the rectangular alignment and pinning member stabilizing a connection between said at least one tightening member and said multi-function attachment member when the multi-function tool and handle hook is not installed on a tool frame but is adapted for use for engagement for hanging of a bail or wire handle on a bucket or other tool, said attachment member and said at least one tightening member comprising a channel comprising a plurality of parallel channel walls adapted for receiving and retaining one of a plurality of differently-configured tools in said attachment member, wherein a first wall of the channel is integral with the attachment member, wherein a second wall of the channel comprises said tightening member, and wherein the plurality of channel walls of said attachment member and said at least one tightening member further comprise opposing hooks adapted for releasable receipt and secure engagement of the bail or wire handle adapted for hanging a tool attached to the bail or wire handle, and wherein at least one of the opposing hooks of said multi-function attachment member further comprises a secured-engagement hook extension for hooking the bail or wire handle, said multi-function attachment member further comprising a plurality of multi-size adjustment ridges adapted for engaging differently-angled brackets of a tool.

\* \* \* \* \*